United States Patent [19]

Slobodnik, Jr. et al.

[11] 3,866,153

[45] Feb. 11, 1975

[54] ULTRA LOW DIFFRACTION LOSS SUBSTRATE MEMBERS FOR ACOUSTIC SURFACE WAVE DEVICES

[75] Inventors: Andrew J. Slobodnik, Jr., Burlington, Mass.; Thomas L. Szabo, Falls Church, Va.

[73] Assignee: The United States of America as represented by the Secretary of the Air Force, Washington, D.C.

[22] Filed: Oct. 11, 1973

[21] Appl. No.: 405,710

[52] U.S. Cl. .................... 333/30 R, 310/9.5, 333/72
[51] Int. Cl. .......................... H01v 7/02, H03h 9/30
[58] Field of Search .............. 333/30 R, 72; 310/9.5; 252/62.9

[56] References Cited

UNITED STATES PATENTS 3,202,846 8/1965 Ballato et al. ........................ 310/9.7

*Primary Examiner*—Eli Lieberman
*Assistant Examiner*—Marvin Nussbaum
*Attorney, Agent, or Firm*—Harry A. Herbert, Jr.; Willard R. Matthews, Jr.

[57] ABSTRACT

The particular anisotropy of specific propagation surface orientations on bismuth germanium oxide substrate members is utilized to achieve minimal diffraction acoustic surface wave propagation. A preferred embodiment utilizes a propagation surface that substantially coincides with a plane defined by the Euler angle Lambda = 45°, Gamma = 40.04°, and Theta = 90°. An alternative embodiment utilizes a propagation surface that substantially coincides with a plane defined by the Euler angles Lambda = 45°, Gamma = 72.53°, and Theta = 90°.

4 Claims, 6 Drawing Figures

ULTRA LOW DIFFRACTION LOSS SUBSTRATE MEMBERS FOR ACOUSTIC SURFACE WAVE DEVICES

BACKGROUND OF THE INVENTION

This invention relates to acoustic surface wave device substrate members, and in particular to the reduction of beam spreading (and diffraction losses) in various acoustic wave devices.

Acoustic surface wave filters and delay lines can be used to substantial advantage to replace electronic filters and to provide ultra long time delays in ECM and other electronic systems where small size, inexpensive, reliable, reproducible devices are needed. However, diffraction losses (losses due to beam spreading) tend to reduce the efficiency of acoustic surface wave delay lines and filters. The design of such filters becomes difficult when highly apodized transducers are required. Apodized transducers, that is, those having minimum and variable overlap between adjacent interdigital transducer fingers, produce very complex acoustic surface wave diffraction patterns. Design of such devices requires precise knowledge of diffraction losses. Beam spreading, therefore, represents a serious problem with respect to both device design and device efficiency. Although substrate members having minimal diffraction characteristics would greatly alleviate these problems no such devices are now available. There currently exists, therefore, the need for ultra low diffraction loss substrate members for various acoustic surface wave device applications. The present invention is directed toward satisfying this need.

SUMMARY OF THE INVENTION

The invention is based on the discovery that certain propagation surface cuts on single crystal bismuth germanium oxide ($Bi_{12}GeO_{20}$) produce acoustic surface wave device substrate members having markedly improved diffraction loss characteristics. Significant improvement is achieved if the propagation surface cut coincides with a plane defined by Euler angles Lambda = 45°, Gamma = an angle in the ranges of 37° = 43° or 69.5° - 75°, and Theta =90°. Optimum diffraction loss conditions (essentially zero beam spreading) occur when the gamma angle is substantially equal to either 40.04° or 72.53°.

It is a principal object of the invention to provide a new and improved substrate member for acoustic surface wave devices.

It is another object of the invention to provide an acoustic surface wave device substrate member having greatly improved diffraction loss characteristics.

It is another object of the invention to provide a substrate member that will improve the efficiency and facilitate the design of highly apodized acoustic surface wave filters.

These, together with other objects, features and advantages, will become more readily apparent from the following detailed description when taken in conjunction with the illustrative embodiment in the accompanying drawings.

DESCRIPTION OF THE DRAWINGS

FIGS. *3a*, *3b* and *3c* illustrate the coordinate system used to define acoustic surface wave propagation in terms of Euler angles.

DETAILED DESCRIPTION OF PREFERRED EMBODIMENT

Due to its low acoustic surface wave velocity and high coupling coefficient, single-crystal bismuth germanium oxide, $Bi_{12}GeO_{20}$ can be used to provide wide bandwidth, low insertion loss, long time delay lines, and other signal processing devices in exceedingly compact packages. Design of such devices, particularly when the input or output transducers are highly apodized, requires precise knowledge of diffraction losses.

Although an exact theoretical description of surface wave diffraction in anisotropic media is quite formidable, many materials can be quantitatively very accurately modeled using an approximate parabolic theory. Within the limits of this theory the diffraction spreading is the same as that for isotropic media but is scaled by the factor $|1 + \delta\phi/\delta\theta|$ where $\delta\phi/\delta\theta$ is the slope of the electromechanical power flow angle. Ideally, then, no diffraction spreading for parabolic surfaces occurs when $\delta\phi/\delta\theta = -1$.

Figure 1:
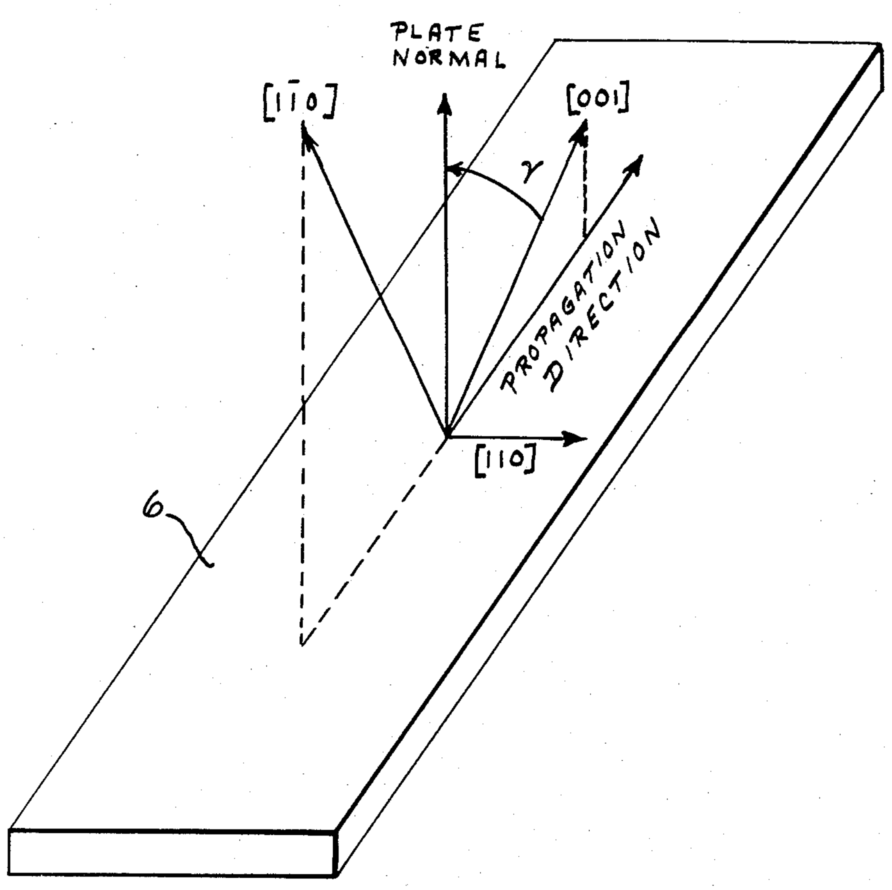
FIG. 1 illustrates an acoustic surface wave device substrate member of the type comprehended by the invention.

Certain acoustic surface wave propagation surface cuts on single crystal bismuth germanium oxide have been discovered that satisfy this condition. FIG. 1 illustrates a $Bi_{12}GeO_{20}$ substrate member 6 together with crystallographic axes and Euler angle notations. Optimum diffraction loss characteristics are obtained if the propagation surface substantially coincides with a plane defined by Euler angles Lambda = 45°, Gamma = 40.04° (or 72.53°) and Theta = 90°.

The coordinate system used to define acoustic surface wave propagation in terms of Euler angles is illustrated by FIGS. *3a*, *3b*, and *3c*. The phase velocity vector lies along the 1 axis while the plate normal lies along the negative 3 axis. The crystalline axes are given by 100, 010 and 001 while the Euler angles are Lambda, Gamma and Theta. FIGS. *3a*, *3b* and *3c* illustrate the standard starting coordinate system in which the propagation axes lineup with the crystalline 100, 010 and 001 axes. It follows therefore that the standard Euler angle rotation Lambda = 45°, Gamma 40.04°, Theta = 90° specified above refers to rotation in a plane perpendicular to the 110 axis and starting with a propagation direction along the $\bar{1}$10 axis and a plate normal along the 001 axis.

Figure 2:
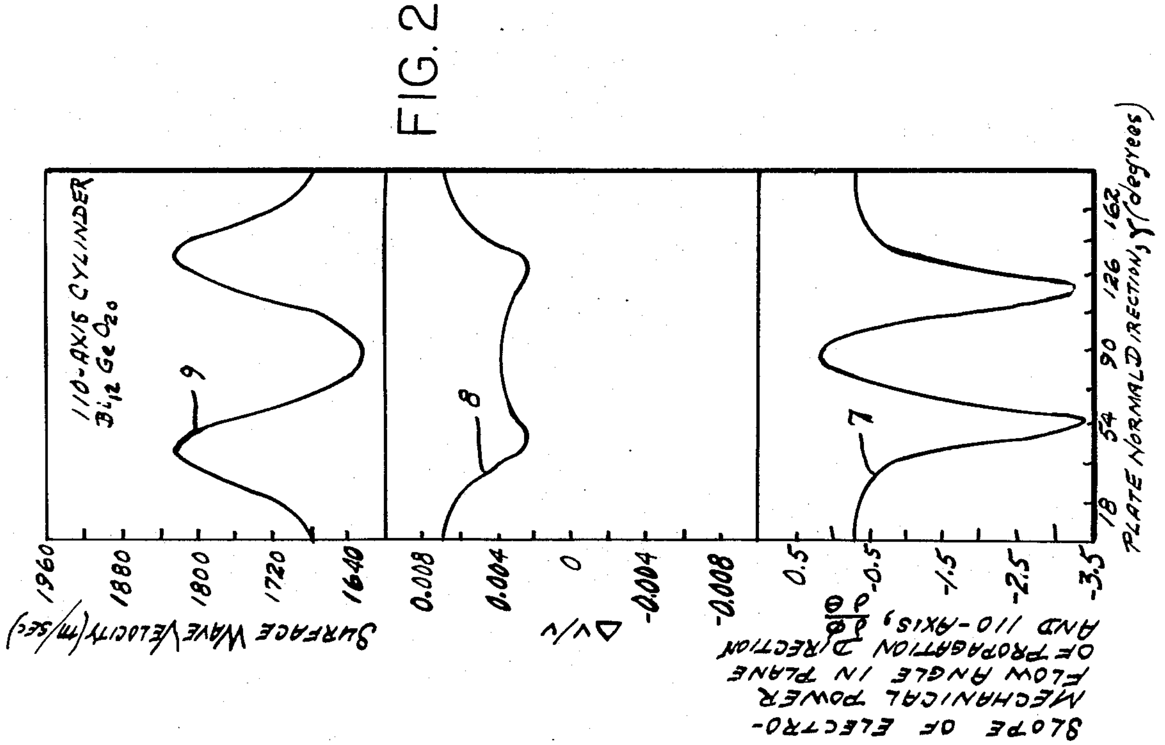
FIG. 2 illustrates curves of surface wave velocity, coupling parameters, and slope of electromechanical power flow angle for a $Bi_{12}GeO_{20}$ substrate member for propagation surfaces defined by Euler angle Lambda = 45°, Gamma = 0° to 180°, and Theta = 90°.
Figure 3A:
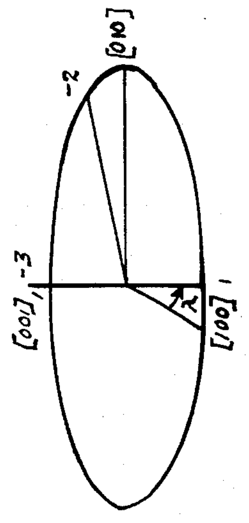
Figure 3B:
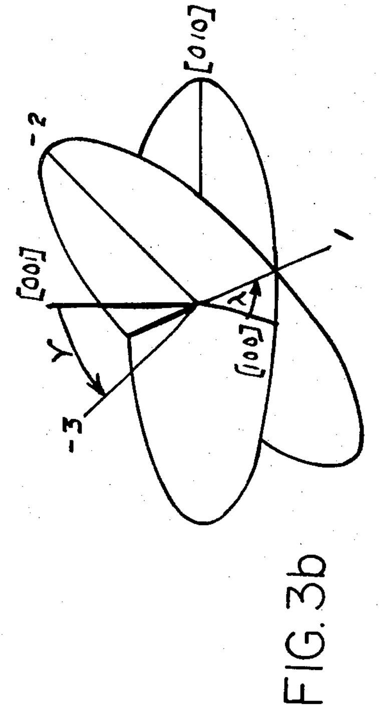
Figure 3C:
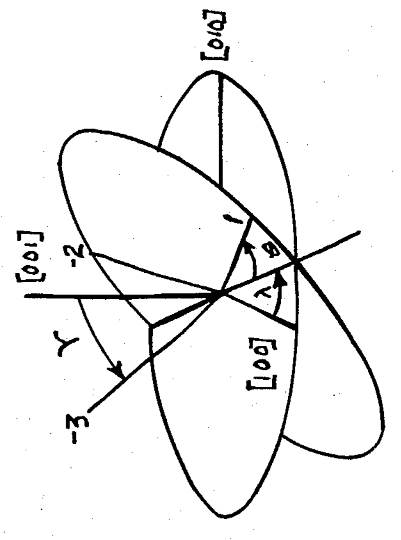

FIG. 2 illustrates curves of surface wave velocity (curve 9), coupling parameters (curve 8) and slope of electromechanical power flow angle (curve 7) for the substrate member 6 of FIG. 1.

The data plotted in FIG. 2 was obtained by varying the Gamma Euler angle from 0° - 180° while holding the Lambda Euler angle at 45° and Theta Euler angle at 90°. This is shown in FIG. 1 and is called a 110-axis cylinder rotation.

As seen in FIG. 2, the slope of the power flow angle does in fact go through the −1 point at Euler angles of

45, 40.04, 90 and 45, 72.53, 90. The velocity and coupling parameter curves 8 and 9 given in FIG. 2 provide further important design information. Since the point at 40.04° corresponds to a velocity surface which is an excellent approximation to a parabola, it is considered a preferred orientation. It will be noted that curve 7 also goes through the —1 point at Gamma angles of 107.47° and 130.04° since the curve is symmetrical around the 90° point. These angles therefor represent an alternate specification for the same crystallographic orientation defined by Gamma angles 40.04 and 72.53.

Figure 4:
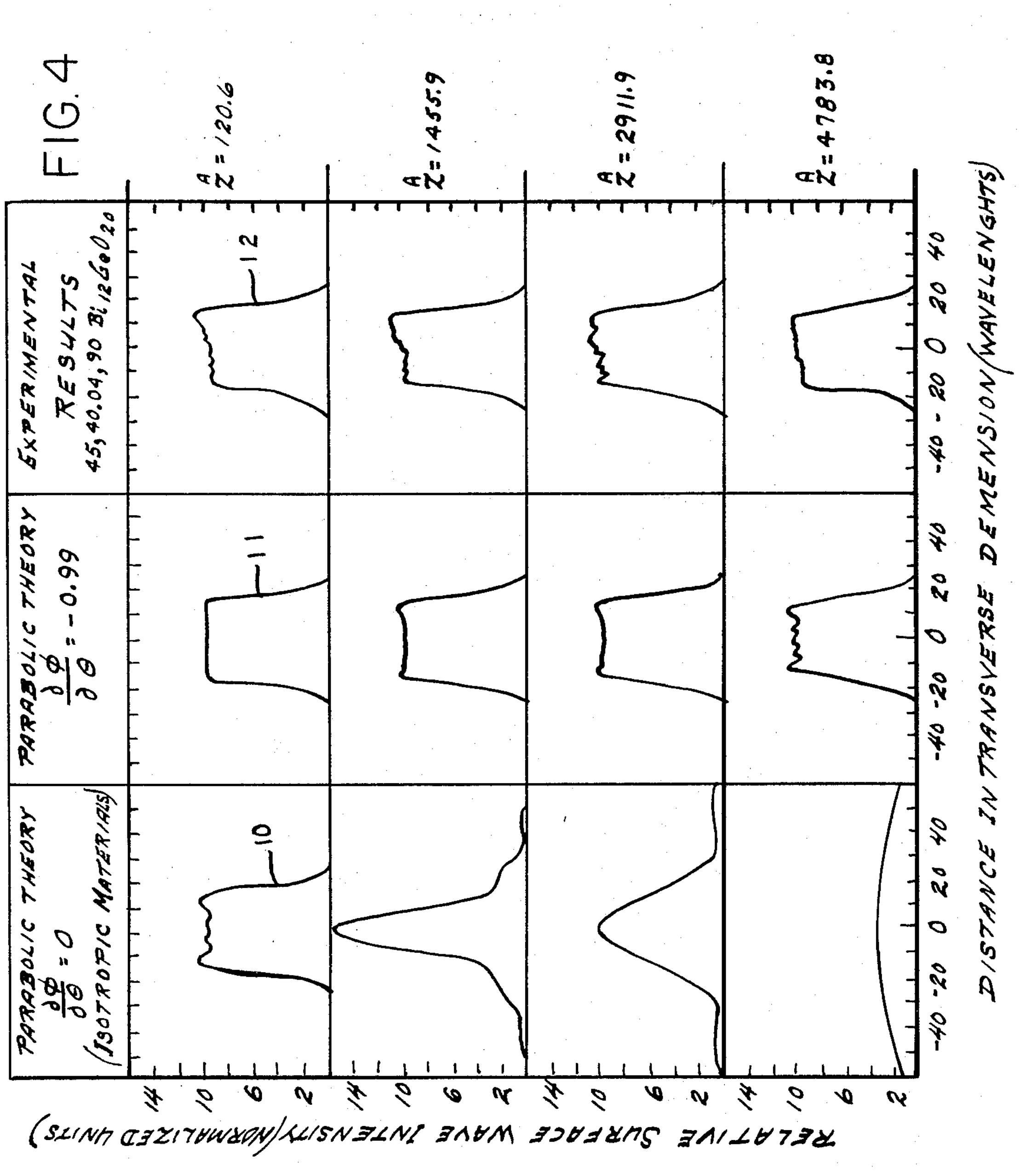
FIG. 4 illustrates experimental and theoretical acoustic surface wave profiles at various distances, $\hat{Z}$, in wavelengths from the input.

By way of example, experimental acoustic surface wave profile measurements were made at various distances from an input interdigital transducer on a $Bi_{12}GeO_{20}$ substrate for which $v = 40.04°$. Frequency was $f = 380$ MHz and the acoustic aperture was $\widehat{L} = 40.56$ wavelengths. Results are shown by profiles 12 in FIG. 4. Theoretical isotropic profiles 10 also included in FIG. 4 clearly illustrate the improvement achieved by this new cut over the isotropic case. In fact, comparison with theoretical profiles 11 also shown in FIG. 4, having diffraction retarded by a factor of 100 ($\delta\phi\delta\theta = -0.99$) establishes that an improvement of at least two orders of magnitude over the isotropic case has been achieved.

While the invention has been described in its preferred embodiment it is understood that the words which have been used are words of description rather than words of limitation and that changes within the purview of the appended claims may be made without departing from the scope and spirit of the invention in its broader aspects.

What is claimed is:

1. An acoustic surface wave device substrate member of single crystal bismuth germanium oxide having a surface wave propagation surface defined by a plane that substantially coincides with the Euler angles Lambda = 45°, Gamma = an angle not less than 37° and not greater than 43, and Theta = 90°.

2. An acoustic surface wave device substrate member as defined in claim 1 wherein the Gamma Euler angle is 40.04°.

3. An acoustic surface wave device substrate member of single crystal bismuth germanium oxide having a surface wave propagation surface defined by a plane that substantially coincides with the Euler angles Lambda = 45°, Gamma = an angle not less than 69.5° and not greater than 75°, and Theta = 90°.

4. An acoustic surface wave device substrate member as defined in claim 3 wherein the Gamma Euler angle is 72.53°.

* * * * *